(12) United States Patent
Woolf

(10) Patent No.: US 11,778,979 B2
(45) Date of Patent: *Oct. 10, 2023

(54) TRAVEL PET BED

(71) Applicant: Peter Woolf, Carlsbad, CA (US)

(72) Inventor: Peter Woolf, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,381

(22) Filed: Oct. 31, 2022

(65) Prior Publication Data

US 2023/0093090 A1 Mar. 23, 2023

Related U.S. Application Data

(63) Continuation of application No. 16/841,264, filed on Apr. 6, 2020, now Pat. No. 11,540,488.

(60) Provisional application No. 62/829,309, filed on Apr. 4, 2019.

(51) Int. Cl.
*A01K 1/035* (2006.01)
*A45F 3/14* (2006.01)

(52) U.S. Cl.
CPC ............... *A01K 1/035* (2013.01); *A45F 3/14* (2013.01)

(58) Field of Classification Search
CPC .. A01K 1/035; A01K 1/03; A45F 3/14; A45F 4/00
See application file for complete search history.

(56) References Cited

U.S. PATENT DOCUMENTS

| 5,226,384 | A | | 7/1993 | Jordan |
| 5,639,145 | A | * | 6/1997 | Alderman ............... A47C 27/15 |
| | | | | 297/452.45 |
| 6,966,275 | B2 | | 11/2005 | Whitehill |
| 7,921,807 | B2 | | 4/2011 | Arvanites |
| 9,706,751 | B2 | | 7/2017 | MacDowell |
| 2006/0288943 | A1 | * | 12/2006 | Ku ........................ A01K 29/00 |
| | | | | 119/28.5 |

(Continued)

FOREIGN PATENT DOCUMENTS

| CN | 2544525 Y | 4/2003 |
| CN | 106305455 A | 1/2017 |

(Continued)

OTHER PUBLICATIONS

USPTO, Office Action for U.S. Appl. No. 16/841,264 dated Feb. 25, 2022.

(Continued)

*Primary Examiner* — Joshua J Michener
*Assistant Examiner* — Henry Hooper Mudd
(74) *Attorney, Agent, or Firm* — Honigman LLP

(57) ABSTRACT

A bed assembly for pets includes a case and a fluid-filled bladder. The case defines an interior volume and has a top portion and a bottom portion opposite the top portion. The top portion includes a bed and a bolster extending from the bed around an outer periphery of the bed, and the bottom portion includes a shoulder strap and a securing mechanism configured to secure the bed in a stowed position. The fluid-filled bladder is disposed in the interior volume and is configured to be inflatable between an uninflated position and an inflated position. The fluid-filled bladder includes a bed bladder adjacent the bed of the case and a bolster bladder adjacent the bolster of the case.

20 Claims, 10 Drawing Sheets

(56) References Cited

U.S. PATENT DOCUMENTS

| | | | | |
|---|---|---|---|---|
| 2007/0272170 A1* | 11/2007 | Milson | ............ | A01K 13/00 |
| | | | | 119/850 |
| 2011/0290834 A1* | 12/2011 | Pelz | ............ | A45F 3/04 |
| | | | | 224/259 |
| 2012/0240860 A1* | 9/2012 | Suplina | ............ | A01K 29/00 |
| | | | | 119/28.5 |
| 2017/0258035 A1* | 9/2017 | Miller | ............ | A01K 1/035 |

FOREIGN PATENT DOCUMENTS

| | | |
|---|---|---|
| DE | 202017104604 U1 | 9/2017 |
| GB | 2175802 A | 12/1986 |
| WO | WO-1998001024 A1 | 1/1998 |

OTHER PUBLICATIONS

DogHelios referenced from: https://www.amazon.com/DogHelios-Aero-Inflatable-Folding-Waterproof-Inflatable/dp/B076ZL81SR?th=1 dated Feb. 18, 2019.
Coupaw retrieved from: https://www.coupaw.com/deals/778/Portable-Inflatable-Pet-Air-Bed?welcome=1 dated Feb. 18, 2019.
Tucker Murphy Pet Retrieved from: https://www.wayfair.com/pet/pdp/tucker-murphy-pet-boulanger-multi-surface-travel-shark-technology-dog-bed-w000589289.html dated Feb. 18, 2019.

* cited by examiner

TRAVEL PET BED

CROSS REFERENCE TO RELATED APPLICATION

This U.S. patent application claims priority under 35 U.S.C. § 120 to U.S. application Ser. No. 16/841,264, filed on Apr. 6, 2020, which claims priority under 35 U.S.C. § 119(e) to U.S. Provisional Application 62/829,309, filed on Apr. 4, 2019. The disclosure of these prior applications are considered part of the disclosure of this application and are hereby incorporated by reference in their entireties.

FIELD

The present disclosure relates generally to travel pet beds.

BACKGROUND

This section provides background information related to the present disclosure which is not necessarily prior art.

Traveling with pets is very common. When traveling with a dog, or other animal, many people desire to bring along a bed for the dog to sleep or lie on during travel, or at the destination. But traveling with a pet bed is not convenient. Most pet beds are bulky in size and weight, are not compactable, are inconvenient to carry, and are often difficult to wash. There is a need for a pet bed designed for travel that is lightweight, durable, compactable, easy to carry, and easy to wash.

Current pet bed products are not designed for travel, are not washable, and/or are not structurally designed for optimal support and comfort for the pet. A pet bed product is needed that is designed for traveling, is washable, and is structurally designed for support and comfort for the pet.

SUMMARY

This section provides a general summary of the disclosure, and is not a comprehensive disclosure of its full scope or all of its features.

In some implementations, a bed assembly for animals includes a case and a fluid-filled bladder. The case defines an interior volume and has a top portion and a bottom portion opposite the top portion. The top portion includes a bed and a bolster extending from the bed around an outer periphery of the bed, and the bottom portion includes a shoulder strap and a securing mechanism configured to secure the bed in a stowed position. The fluid-filled bladder is disposed in the interior volume and is configured to be inflatable between an uninflated position and an inflated position. The fluid-filled bladder includes a bed bladder adjacent the bed of the case and a bolster bladder adjacent the bolster of the case.

The bed assembly may include a cover configured to wrap around the bolster and cover the top portion of the case. The bed may include an inner bed surface and an outer bed surface opposite the inner bed surface, the inner bed surface including a first fastener and the cover including a second fastener configured to engage the first fastener to secure the cover to the case. The first fastener may include one of hooks or loops and the second fastener includes the other of hooks or loops. The cover may include an elastic band that wraps around the bolster of the case.

The bed may include an inner bed surface and an outer bed surface opposite the inner bed surface, the inner bed surface defining an envelope configured to receive an insert. The insert may have a shape generally corresponding to the shape of the bed, and the insert is formed of a foam material.

The bolster may include an inner bolster surface and an outer bolster surface opposite the inner bolster surface, the outer bolster surface being formed of a more water resistant material than the material of the inner bolster surface.

When the bed is in the stowed position, the bottom portion of the case may be folded in on the top portion of the case to conceal a majority of the top portion of the case and expose the bottom portion of the case, and the securing mechanism wraps around at least a portion of the bottom portion of the case to secure the bed in a stowed position.

In some implementations, a pet bed assembly includes a case, a cover, and a fluid-filled bladder. The case defines an interior volume and has a top portion and a bottom portion opposite the top portion, the top portion including a bed having an outer bed surface and an inner bed surface opposite the inner bed surface and the top portion including a bolster extending from the outer bed surface around an outer periphery of the bed, and the bottom portion including a shoulder strap and a securing mechanism configured to secure the bed in a stowed position. The cover is configured to wrap around the bolster and cover the top portion of the case. The fluid-filled bladder is disposed in the interior volume and including a bed bladder and a bolster bladder each configured to be independently inflatable between an uninflated position and an inflated position, the bed bladder being adjacent the bed of the case and the bolster bladder being adjacent the bolster of the case.

The inner bed surface may include a first fastener and the cover including a second fastener configured to engage the first fastener to secure the cover to the case. The first fastener may include one of hooks or loops and the second fastener includes the other of hooks or loops.

The cover may include an elastic band that wraps around the bolster of the case. The bed may include an inner bed surface and an outer bed surface opposite the inner bed surface, the inner bed surface defining an envelope configured to receive an insert. The insert may have a shape generally corresponding to the shape of the bed, and the insert is formed of a foam material.

The bolster may include an inner bolster surface and an outer bolster surface opposite the inner bolster surface, the outer bolster surface being formed of a more water resistant material than the material of the inner bolster surface.

When the bed is in the stowed position, the bottom portion of the case may be folded in on the top portion of the case to conceal a majority of the top portion of the case and expose the bottom portion of the case, and the securing mechanism wraps around at least a portion of the bottom portion of the case to secure the bed in a stowed position.

The top portion of the case and the bottom portion of the case may be secured to each other via a zipper, wherein when the zipper is in an unzipped position, the interior volume is accessible such that the fluid-filled bladder may be removed from the interior volume.

In some implementations, a pet bed includes a case defining an interior volume, a cover, and a fluid-filled bladder. The case includes a top portion and a bottom portion. The top portion includes a bed having an outer bed surface and an inner bed surface opposite the inner bed surface, the inner bed surface defining an envelope configured to receive a foam insert, the outer bed surface including a first fastener, the top portion including a bolster extending from the outer bed surface around an outer periphery of the bed, and the bolster including an inner bolster surface formed of a first material and an outer bolster surface formed of a second material more water resistant than the first material. The bottom portion is opposite the top portion and includes a shoulder strap and a securing mechanism configured to secure the bed in a stowed position, the bottom portion being formed of a third material more water resistant than the first material. The cover is configured to wrap around the bolster and cover the top portion of the case, the cover including a second fastener and an elastic band that wraps around the bolster of the case, the second fastener configured to engage the first fastener to secure the cover to the case. The fluid-filled bladder is disposed in the interior volume and including a bed bladder and a bolster bladder each configured to be independently inflatable between an uninflated position and an inflated position, the bed bladder being adjacent the bed of the case and the bolster bladder being adjacent the bolster of the case.

The bed bladder may include a bed valve configured to receive a first fluid and the bolster bladder may include a bolster valve configured to receive a second fluid, the bed bladder including a plurality of ribs extending parallel to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
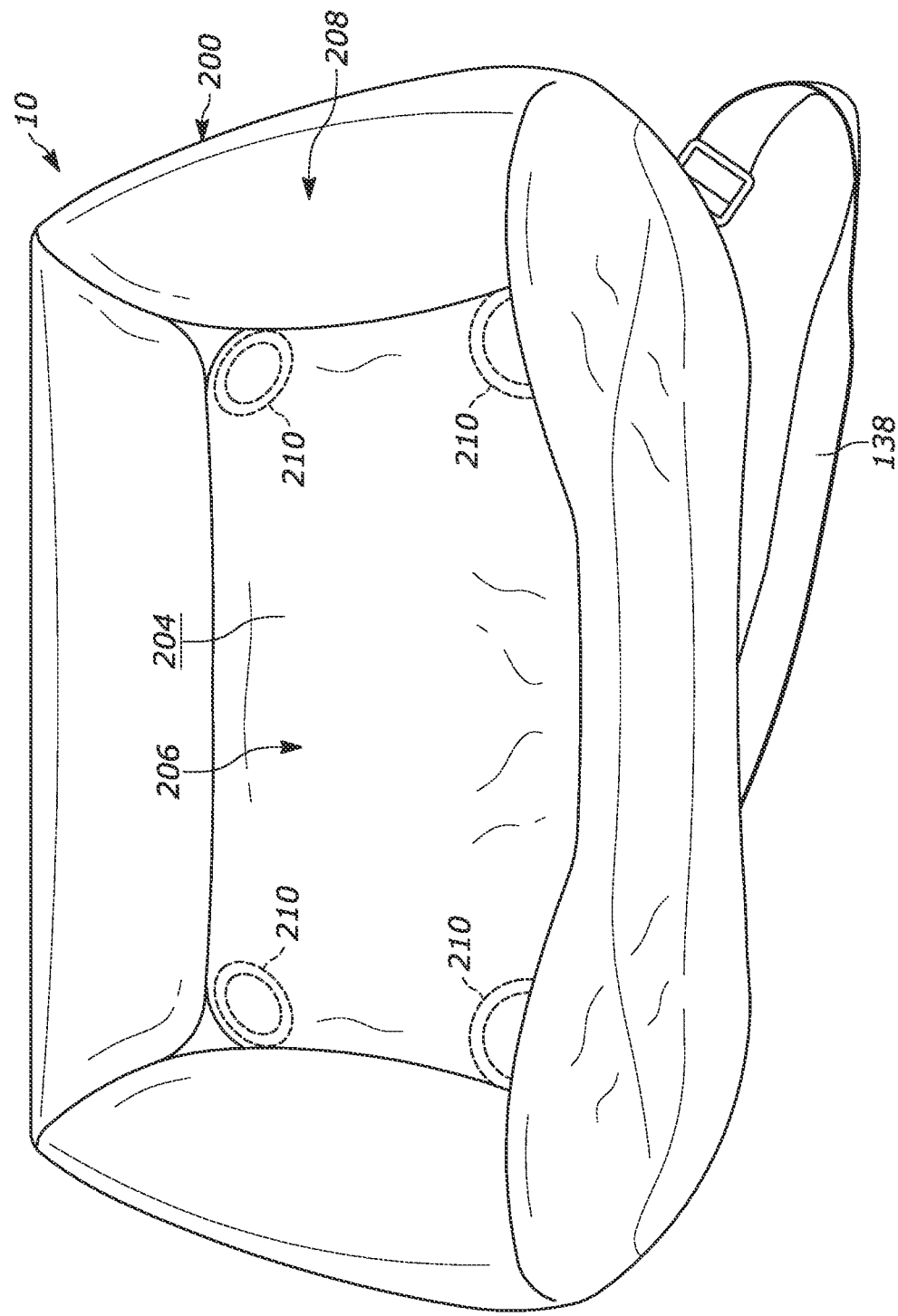
FIG. 1 is a perspective view of a pet bed in an operational position in accordance with the principles of the present disclosure.

Referring to FIG. 1, a bed assembly 10 is generally shown. The bed assembly 10 is configured to be used by an animal, such as a dog, cat, or any other suitable animal. The bed assembly 10 may include certain features and functionality which make it suitable for convenient and efficient travel, as will become apparent. While the bed assembly 10 is described as being suitable for travel, the bed assembly 10 may likewise be implemented as a semi-permanent and stationary animal bed, such as at an animal owner's house.

The bed assembly 10 includes a case 100, a cover 200, and a fluid-filled bladder 300. The case 100 includes a top portion 102 and a bottom portion 104 opposite the top portion 102. The top portion 102 and the bottom portion 104 cooperate to define an interior volume 106, which is configured to receive the fluid-filled bladder 300. The top portion 102 of the case 100 includes a bed 108 and a bolster 110 extending around an outer periphery of the bed 108. The bed 108 includes an inner bed surface 112 and an outer bed surface 114 opposite the inner bed surface 112.

Figure 5:
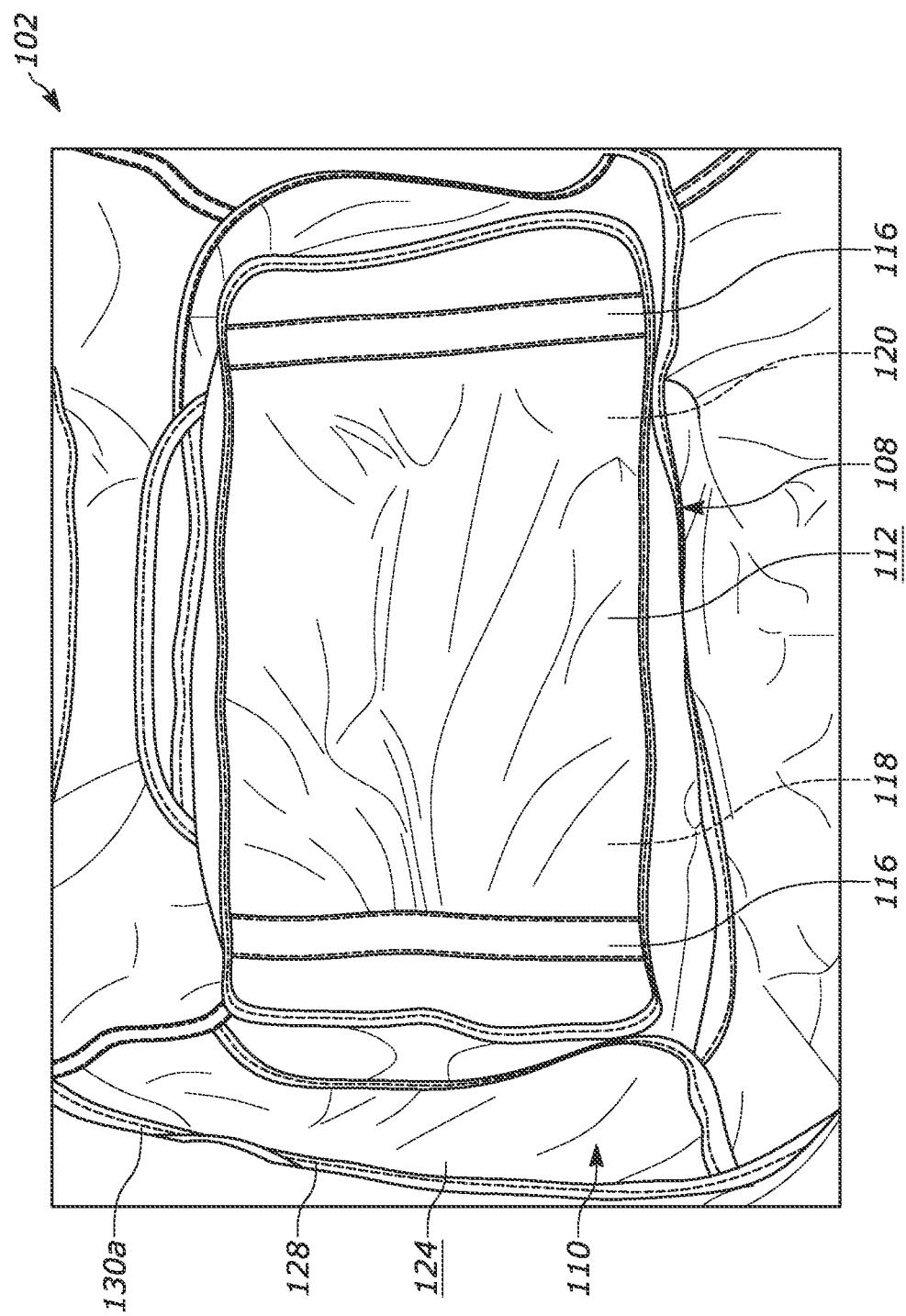
FIG. 5 is a perspective view of an underside of a case of the pet bed of FIG. 1.
Figure 6:
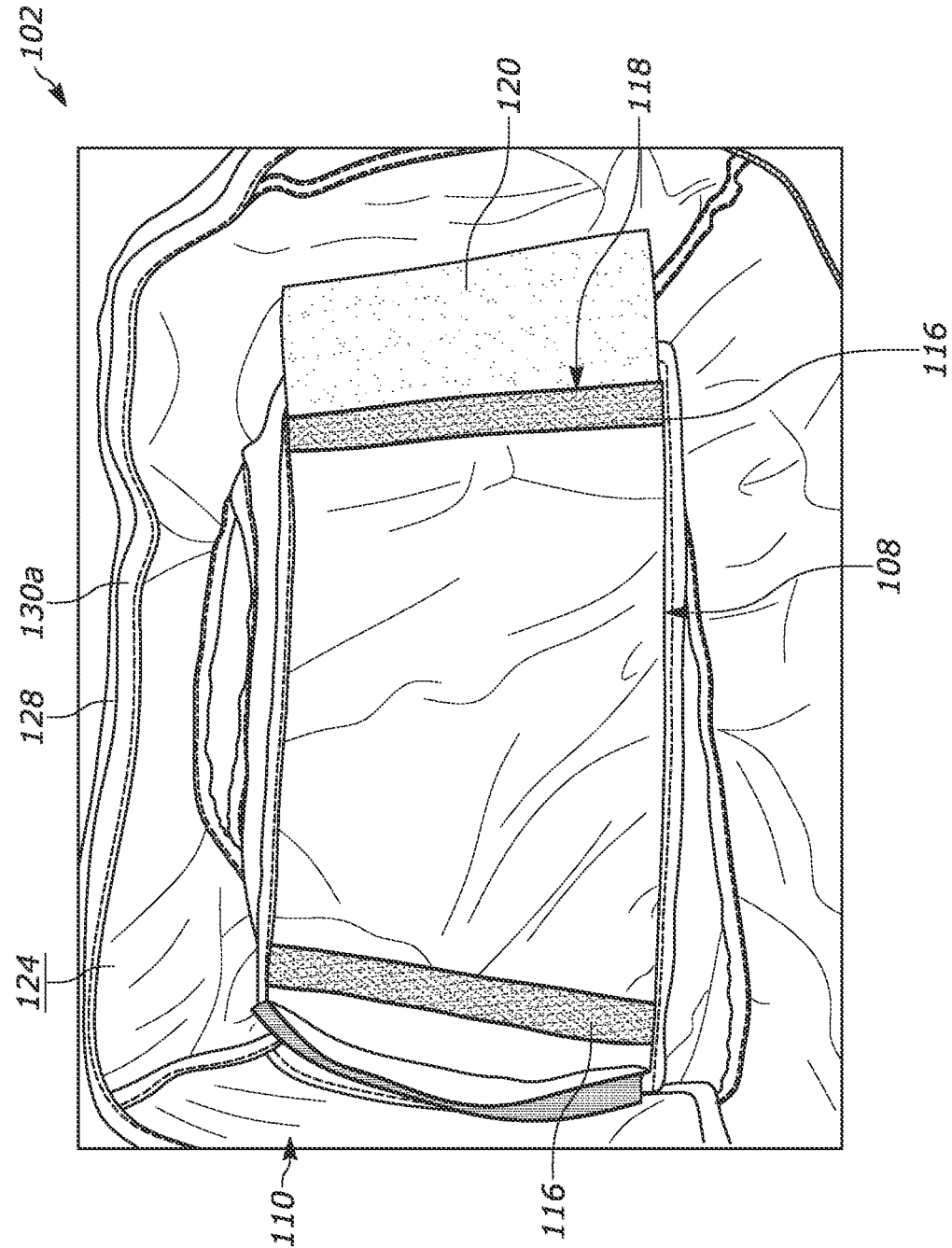
FIG. 6 is a perspective view of an underside of the case of FIG. 5 with an insert partially removed from an envelope.

Referring to FIGS. 5 and 6, the inner bed surface 112 faces the fluid-filled bladder 300. The inner bed surface 112 may include at least one fastener 116 which provides access to an envelope 118 defined by the inner bed surface 112. In some implementations, there may be two fasteners 116 at opposite ends of the envelope 118. The fasteners 116 may be hook-and-loop fasteners, buckle fasteners, button fasteners, or any other suitable fastener. The envelope 118 is configured to receive an insert 120, which may have a shape generally corresponding to the shape of the bed 108. For example, the insert 120 may have a generally rectangular shape. In some implementations, the insert 120 is formed of a resilient polymeric material, such as foam or rubber, to impart cushioning properties to the animal. Example resilient polymeric materials for the insert 120 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

Figure 2:
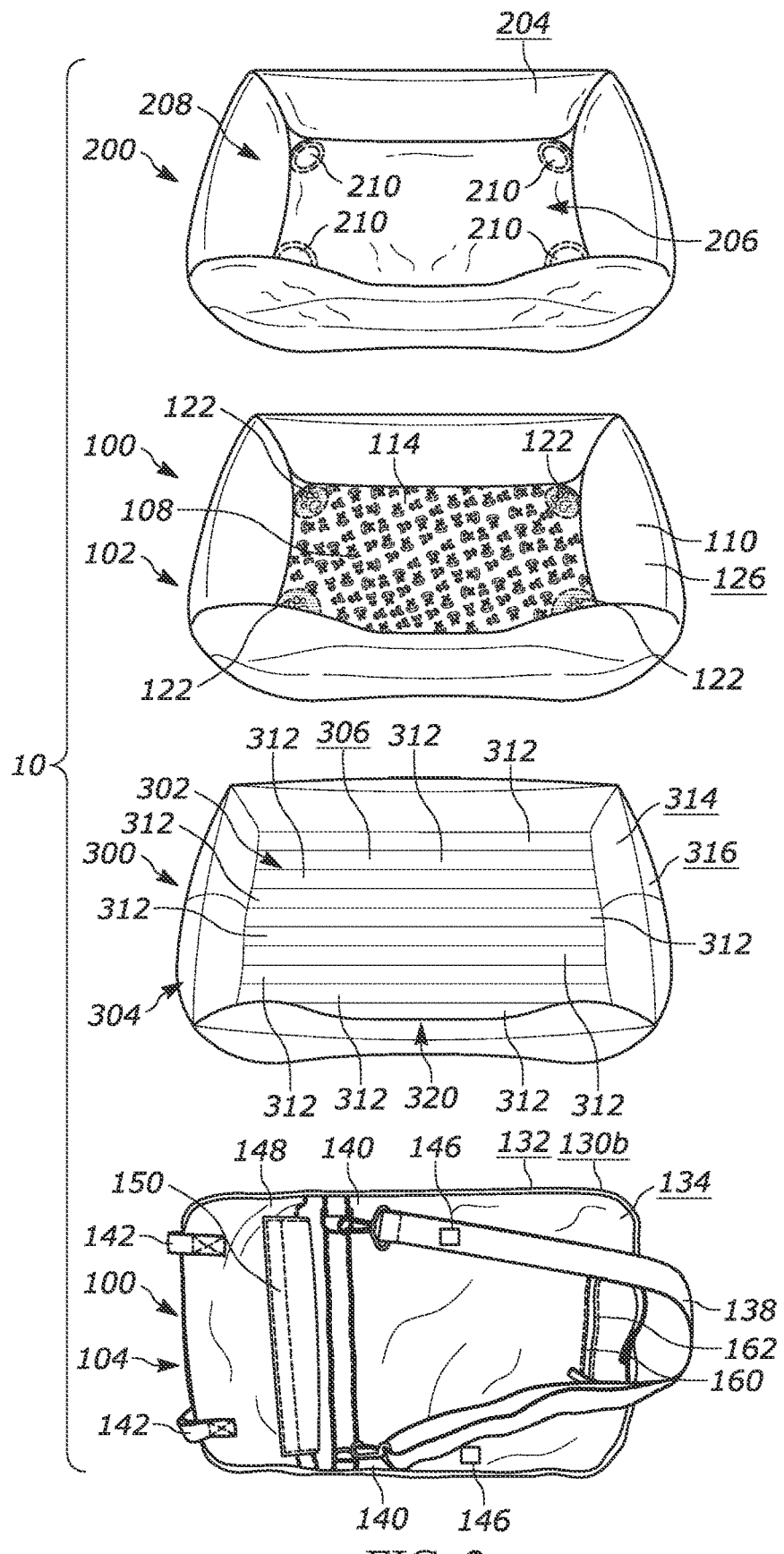
FIG. 2 is an exploded view of the pet bed of FIG. 1.
Figure 3:
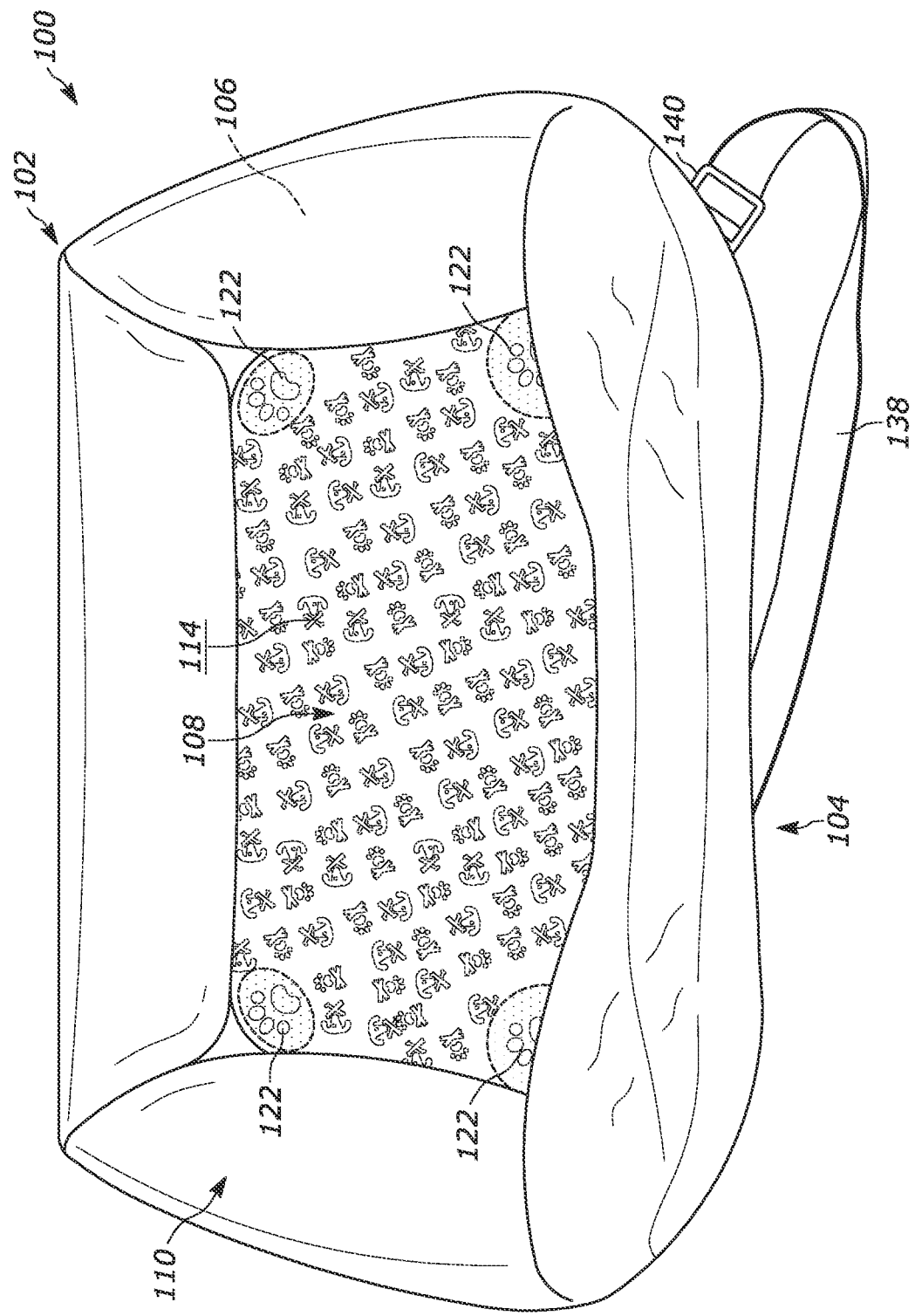
FIG. 3 is a perspective view of the pet bed of FIG. 1 with a cover removed.

Referring to FIGS. 2 and 3, the outer bed surface 114 includes at least one fastener 122. In some implementations, the outer bed surface 114 may include four fasteners 122 with each fastener being disposed at a corner of the outer bed surface 114. The fasteners 122 may be hook-and-loop fasteners, buckle fasteners, button fasteners, or any other suitable fastener. The outer bed surface 114 may be formed of a material to provide comfort to the animal, such as a microfiber material, cloth material, leather material, etc. The outer bed surface 114 may include any suitable design(s) or graphic(s) to provide visually appealing aesthetics.

With continued reference to FIGS. 2 and 3, the bolster 110 extends from the outer bed surface 114 of the bed 108. The bolster 110 includes an inner bolster surface 124 and an outer bolster surface 126 opposite the inner bolster surface 124. The inner bolster surface 124 generally faces the bed 108, while the outer bolster surface 126 faces away from the bed 108. The inner bolster surface 124 may be formed of a material to provide comfort to the animal, such as a microfiber material, cloth material, leather material, etc. In some implementations, the inner bolster surface 124 and the outer bed surface 114 may be formed of the same material. The outer bolster surface 126 may be formed of a material that has properties such as water resistance, waterproof, tear resistance, bite resistance, scratch resistance, etc. In some implementations, the outer bolster surface 126 is formed of a material more water resistant than the material of the inner bolster surface 124. The outer bolster surface 126 may be formed of a nylon material, polyester material, and/or any suitable material coated or impregnated with materials to provide properties such as water resistance, waterproof, tear resistance, bite resistance, scratch resistance, etc.

The outer bolster surface 126 extends from the inner bolster surface 124 to a terminal end 128, as shown in FIGS. 5 and 6. A zipper 130, or any other suitable fastener, may connect the top portion 102 to the bottom portion 104. For example, the zipper 130 may include a first zipper portion 130a disposed at the terminal end 128, and the bottom portion 104 may include a second zipper portion 130b corresponding to the first zipper portion 130a. The first zipper portion 130a and the second zipper portion 130b are configured to mate with one another.

Figure 9:
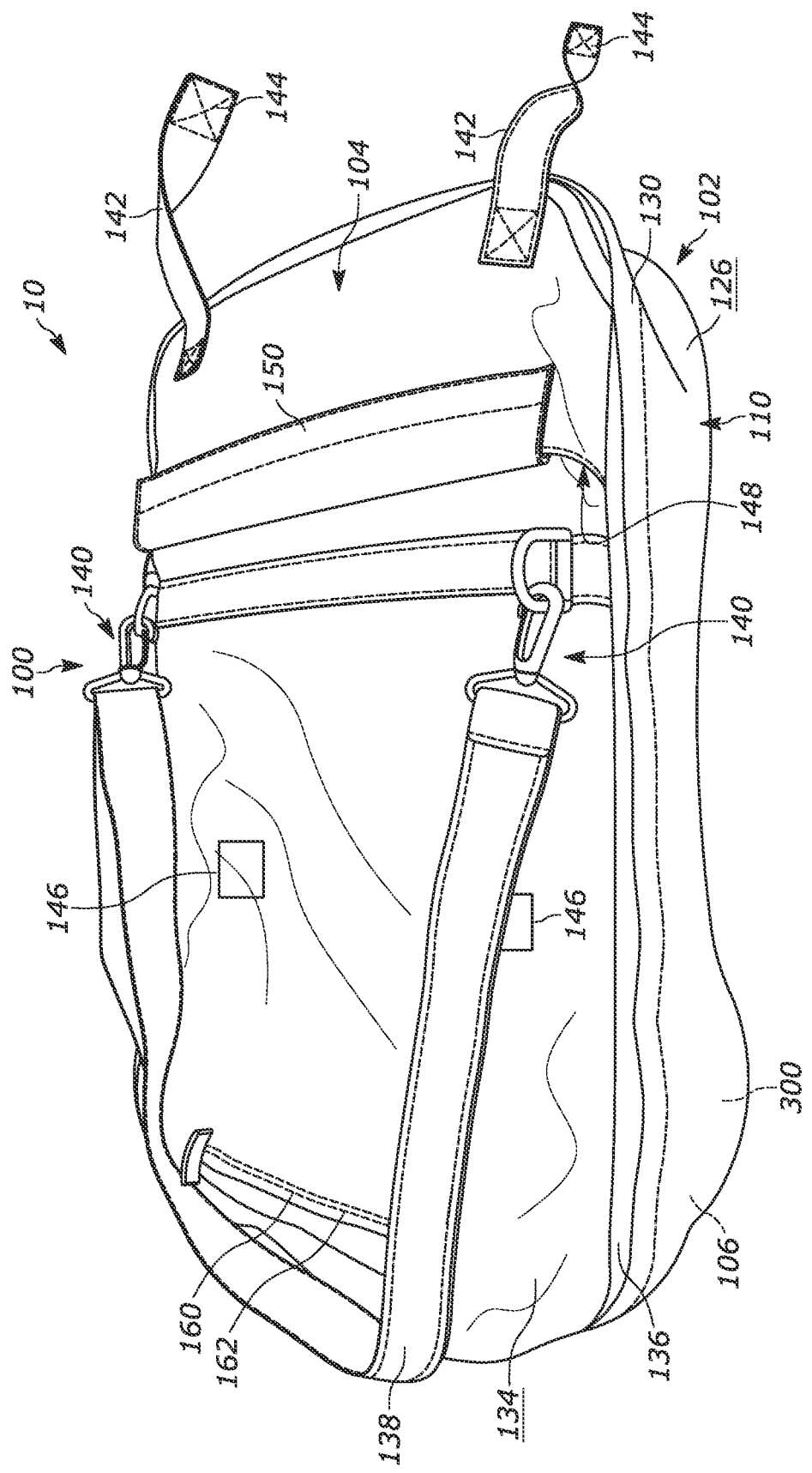
FIG. 9 is a perspective view of a bottom of the pet bed of FIG. 1.
Figure 10:
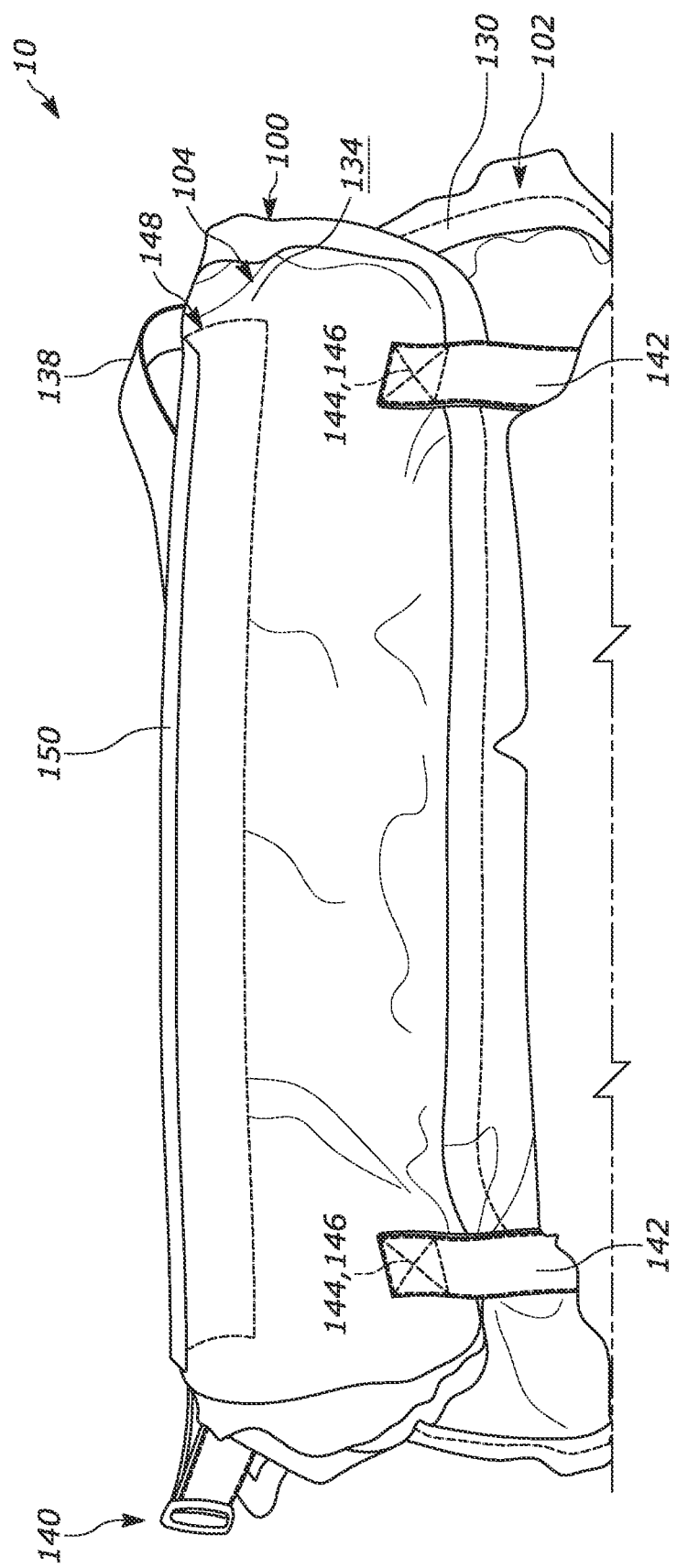
FIG. 10 is a perspective view of the pet bed of FIG. 1 in a stowed position.

Referring to FIGS. 2, 9, and 10, the bottom portion 104 of the case 100 includes an inner surface 132, an outer surface 134 opposite the inner surface 132, and a peripheral edge 136 between the inner surface 132 and the outer surface 134. The inner surface 132 faces the fluid-filled bladder 300. The outer surface 134 may be formed of a material that has properties such as water resistance, waterproof, tear resistance, bite resistance, scratch resistance, etc. In some implementations, the outer surface 134 is formed of a material more water resistant than the material of the inner bolster surface 124. The outer surface 134 may be formed of a nylon material, polyester material, and/or any suitable material coated or impregnated with materials to provide properties such as water resistance, waterproof, tear resistance, bite resistance, scratch resistance, etc.

The outer surface 134 includes a shoulder strap 138 that is secured to the outer surface 134 via at least one fastener 140. For example, the outer surface 134 may include two fasteners 140. The fasteners 140 may be hook-and-loop fasteners, buckle fasteners, button fasteners, or any other suitable fastener. The outer surface 134 includes at least one securing strap 142. For example, the outer surface 134 may include two securing straps 142. The securing straps 142 may be located at or near the peripheral edge 136 of the bottom portion 104. Each securing strap 142 may include a fastener 144 at a distal end, and the outer surface 134 may include corresponding securing fasteners 146 spaced from the securing straps 142. The fasteners 144, 146 may be hook-and-loop fasteners, buckle fasteners, button fasteners, or any other suitable fasteners. For example, the fastener 144 may be one of a hook-and-loop fastener (i.e., a hook fastener) and the securing fastener 146 may be the other of a hook-and-loop fastener (i.e., a loop fastener) configured to engage with the fastener 144. The bed assembly 10 may be movable between an operational position, as shown in FIG. 1, and a stowed position, as shown in FIG. 10. In the stowed position, the securing straps 142 may be wrapped around at least a portion of the outer surface 134 to engage the fasteners 144 with the securing fasteners 146 to secure the bed assembly 10 in the stowed position.

Referring to FIGS. 2, 9, and 10, the outer surface 134 may include a pocket 148 accessible via a fastener 150. The fastener 150 may be a hook-and-loop fastener, buckle fastener, button fastener, or any other suitable fastener. The pocket 148 may be easily accessible while the bed assembly is in the stowed position and a user is carrying the bed assembly 10 via the shoulder strap 138. In some implementations, the pocket 148 may be used to store pet accessories, such as a leash, collar, pet food, etc. The outer surface 134 may include an access sleeve 160 accessible via a zipper 162, or any other suitable fastener. The access sleeve 160 is configured to provide access to at least one inflation mechanism for the fluid-filled bladder 300.

Figure 4:
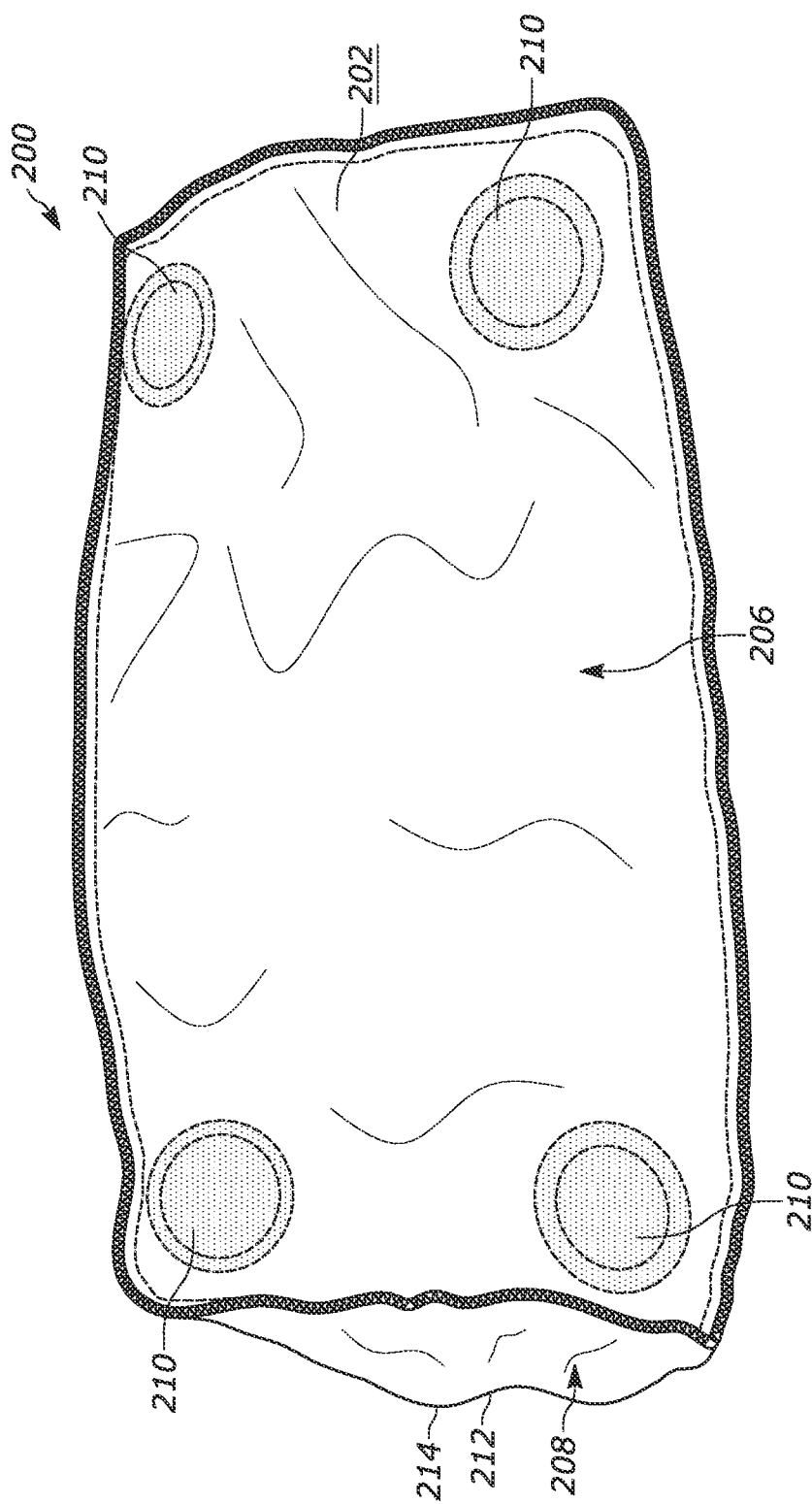
FIG. 4 is a perspective view of an underside of the cover of the pet bed of FIG. 1.

Referring to FIGS. 1, 2, and 4, the cover 200 may generally resemble a fitted sheet for a mattress. The cover 200 includes an inner surface 202 and an outer surface 204 opposite the inner surface 202. The cover 200 includes a bed portion 206 and a bolster portion 208. The bed portion 206 has a shape that generally corresponds to the shape of the bed 108. The inner surface 202 of the bed portion 206 faces the outer bed surface 114 of the bed 108. The inner surface 202 of the bed portion 206 includes at least one fastener 210 configured to engage with the fasteners 122 of the bed 108. For example, there may be four fasteners 122 on the bed 108 and four corresponding fasteners 210 on the cover 200. The fasteners 210 on the cover 200 are configured to engage with the fasteners 122 on the bed 108 to secure the bed portion 206 of the cover 200 to the bed 108.

The bolster portion 208 extends from the bed portion 206 to a terminal end 212. The bolster portion 208 may have a shape that generally corresponds to the shape of the bolster 110, the bolster portion 208 is configured to wrap around and cover the bolster 110. The bolster portion 208 may include an elastic band 214 at or near the terminal end 212. To wrap the bolster portion 208 around the bolster 110, the elastic band 214 may be expanded, and when the terminal end 212 extends near, at, or past the terminal end 128 of the bolster 110, the elastic band 214 may constrict to secure the cover 200 to the case 100, in cooperation with the fasteners 122, 210.

The cover 200 may be formed of a material to provide comfort to the animal, such as a microfiber material, cloth material, leather material, etc. The outer surface 204 may include any suitable design(s) or graphic(s) to provide visually appealing aesthetics. The cover 200 may be selectively removable from the case 100 such that the cover 200 can be individually washed, easily replaced, etc. In some implementations, the bed assembly 10 may include multiple interchangeable covers 200 for a variety of purposes. For example, one of the covers 200 may be formed of a water resistant material, one of the covers 200 may include a graphic of the pet owner's favorite sports team, etc. When the bed assembly 10 is in the stowed position (FIG. 10), the cover 200 may remain secured to the case 100, or, alternatively, the cover 200 may be removed and stored, e.g., in the pocket 148, or any other suitable location.

Figure 7:
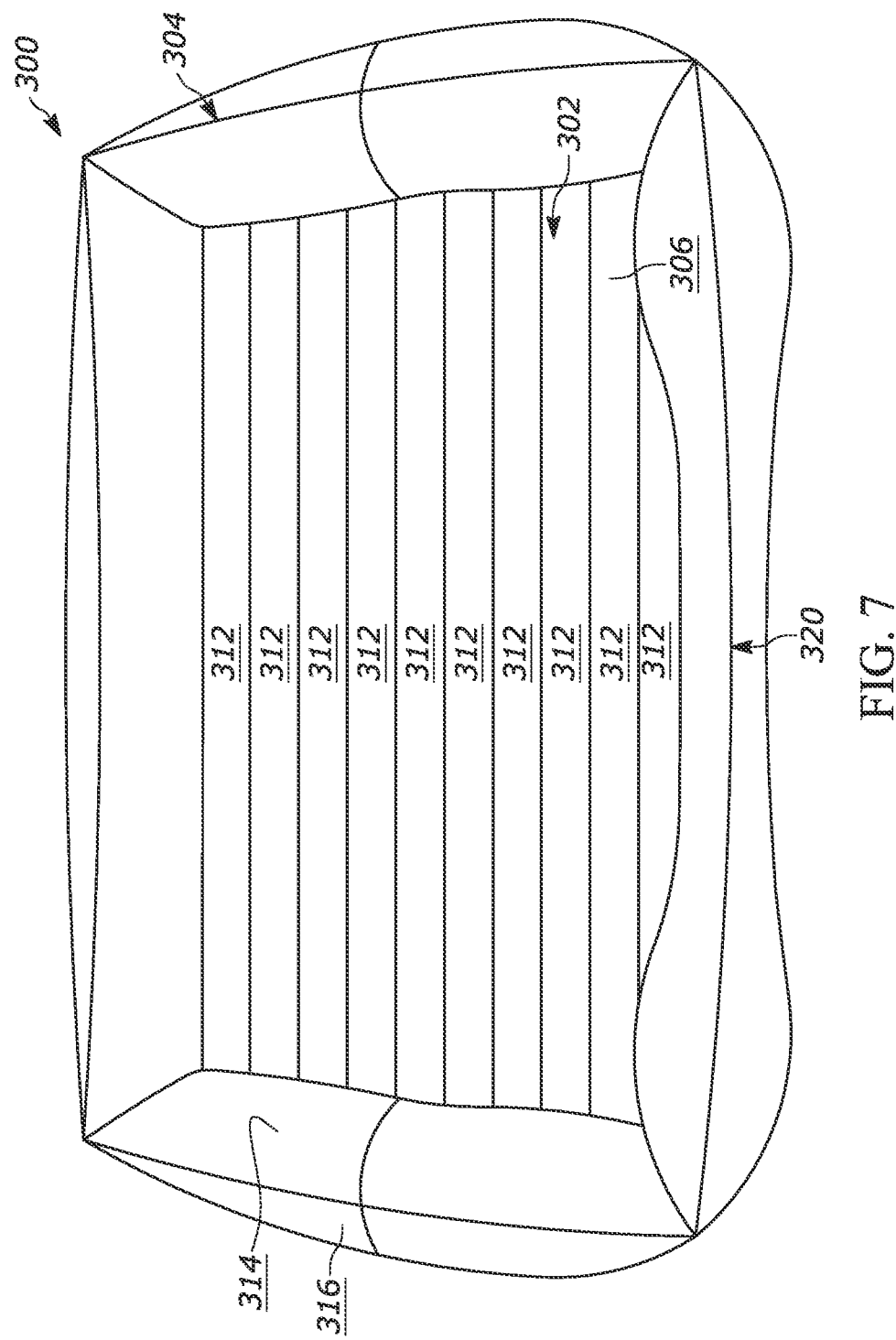
FIG. 7 is a perspective view of a top of a bladder of the pet bed of FIG. 1.
Figure 8:
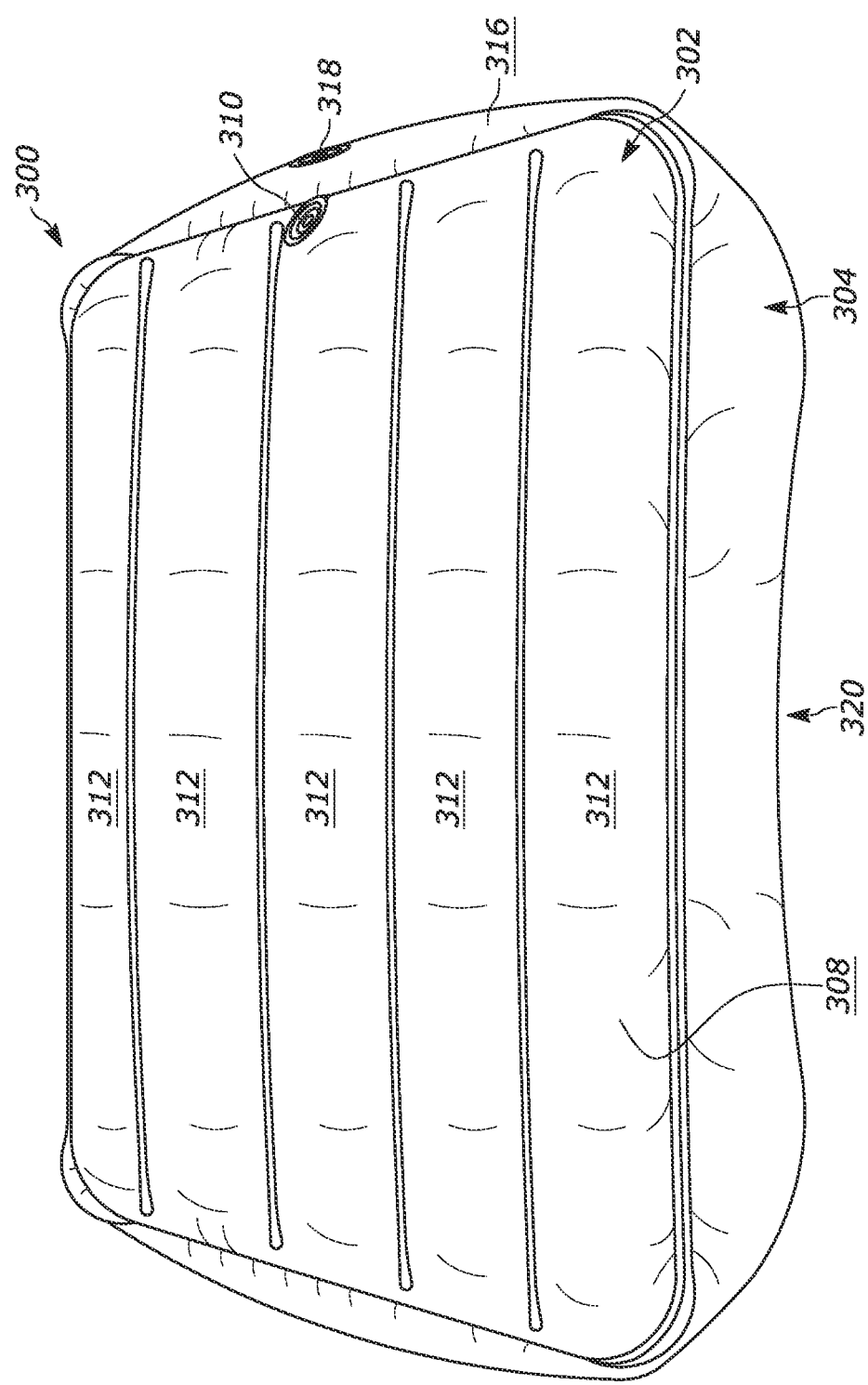
FIG. 8 is a perspective view of a bottom of the bladder of FIG. 7.

Referring to FIGS. 2, 7, and 8, the fluid-filled bladder 300 includes a bed bladder 302 and a bolster bladder 304. In some implementations, the bed bladder 302 and the bolster bladder 304 may be two discrete fluid-filled chambers. In other implementations, the bed bladder 302 and the bolster bladder 304 may be one continuous fluid-filled chamber. The fluid-filled bladder 300 may be filled with any suitable fluid, such as air, water, pressurized gas, etc. The fluid-filled bladder 300 may be formed from an elastomeric material that includes one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

The bed bladder 302 includes an upper surface 306 and a lower surface 308 opposite the upper surface 306. The upper surface 306 faces the inner bed surface 112 of the bed 108 of the top portion 102 of the case 100, and the lower surface 308 faces the inner surface 132 of the bottom portion 104 of the case 100. The bed bladder 302 includes an inflation mechanism or valve 310 configured to facilitate inflation and deflation of the bed bladder 302. The valve 310 may be accessible via the access sleeve 160. The bed bladder 302 includes a plurality of ribs 312 extending parallel to one another. The bed bladder 302 may include any suitable number of ribs 312. The ribs 312 may provide comfort and/or structural support.

The bolster bladder 304 includes an inner surface 314 and an outer surface 316 opposite the inner surface 314. The inner surface 314 and the outer surface 316 each face the inner bolster surface 124 of the bolster 110 of the top portion 102 of the case 100. The bolster bladder 304 includes an inflation mechanism or valve 318 configured to facilitate inflation and deflation of the bolster bladder 304. The valve 318 may be accessible via the access sleeve 160. In some implementations, there may be a single access sleeve 160 that provides access to both valves 310, 318. In other implementations, there may be two access sleeves 160, each sleeve 160 configured to provide access to each of the valves 310, 318. In implementations where the bed bladder 302 and the bolster bladder 304 are one continuous fluid-filled chamber, only one valve may be implemented. The bolster bladder 304 includes an indent 320 indicating an entrance for the animal. That is, the indent 320 may have a height lower than the remaining portions of the bolster bladder 304, such that an animal may more easily step over the indent 320 to access the bed 108.

To move the bed assembly 10 from the operational position (FIG. 1) to the stowed position (FIG. 10), the zipper 162 may be operated to provide access to the valves 310, 318 via the access sleeve 160. The valves 310, 318 may be opened to release the fluid in the fluid-filled bladder 300 and deflate the fluid-filled bladder 300. Once deflated, the case 100 (either with or without the cover 200 attached) is folded or rolled upon itself with the end of the case 100 having the securing straps 142 remaining exposed. The securing straps 142 may then be wrapped around a portion of the case 100 to secure the fastener 144 of the securing strap 142 to the securing fastener 146 on the outer surface 134 of the bottom portion 104 of the case 100. At this point, the securing straps 142 secure the bed assembly 10 in the stowed position, and a majority of the inner bed surface 112 and inner bolster surface 124 (or inner surface 202 of the cover 200) are concealed, thus, leaving exposed the portions of the case 100 having properties such as water resistance, waterproof, tear resistance, bite resistance, scratch resistance, etc. In other words, a majority of the top portion 102 of the case 100 is concealed, while the bottom portion 104 of the case 100 is exposed. Such a configuration protects the more sensitive interior materials and exposes the tougher materials to any elements experienced during travel or storage activities.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed above could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A bed assembly for pets, the bed assembly comprising:
   a case defining an interior volume and having a top portion and a bottom portion opposite the top portion, the case including a bed and a bolster; and
   a fluid-filled bladder disposed in the interior volume, the fluid-filled bladder including a bed bladder adjacent the bed of the case and a bolster bladder adjacent the bolster of the case;
   wherein the bed includes an inner bed surface and an outer bed surface opposite the inner bed surface, the inner bed surface defining an envelope including at least one fastener that selectively provides access to a cavity that is configured to receive a foam insert that has a shape generally corresponding to the shape of the bed.

2. The bed assembly of claim 1, further comprising a cover configured to wrap around the bolster and cover the top portion of the case.

3. The bed assembly of claim 2, wherein the bed includes an inner bed surface and an outer bed surface opposite the inner bed surface, the inner bed surface including a first fastener and the cover including a second fastener configured to engage the first fastener to secure the cover to the case.

4. The bed assembly of claim 3, wherein the first fastener includes one of hooks or loops and the second fastener includes the other of hooks or loops.

5. The bed assembly of claim 2, wherein the cover includes an elastic band that wraps around the bolster of the case.

6. The bed assembly of claim 1, wherein the bolster includes an inner bolster surface and an outer bolster surface opposite the inner bolster surface, the outer bolster surface being formed of a more water resistant material than the material of the inner bolster surface.

7. The bed assembly of claim 1, wherein the bed is convertible between a stowed position and an operational position.

8. The bed assembly of claim 7, further comprising a securing mechanism configured to secure the bed in the stowed position.

9. The bed assembly of claim 8, wherein when the bed is in the stowed position, the bottom portion of the case is folded in on the top portion of the case to conceal a majority of the top portion of the case and expose the bottom portion of the case, and the securing mechanism wraps around at least a portion of the bottom portion of the case to secure the bed in the stowed position.

10. A pet bed assembly comprising:
a case defining an interior volume and having a top portion and a bottom portion opposite the top portion, the case including a bed and a bolster, and a securing mechanism configured to secure the bed in a stowed position; and
a fluid-filled bladder disposed in the interior volume, the fluid-filled bladder including a bed bladder adjacent the bed of the case and a bolster bladder adjacent the bolster of the case;
wherein the bed includes an inner bed surface and an outer bed surface opposite the inner bed surface, the inner bed surface defining an envelope including at least one fastener that selectively provides access to a cavity that is configured to receive a foam insert that has a shape generally corresponding to the shape of the bed.

11. The pet bed assembly of claim 10, wherein the inner bed surface includes a first fastener and a cover including a second fastener configured to engage the first fastener to secure the cover to the case.

12. The pet bed assembly of claim 11, wherein the first fastener includes one of hooks or loops and the second fastener includes the other of hooks or loops.

13. The pet bed assembly of claim 10, wherein the cover includes an elastic band that wraps around the bolster of the case.

14. The pet bed assembly of claim 10, wherein the bolster includes an inner bolster surface and an outer bolster surface opposite the inner bolster surface, the outer bolster surface being formed of a more water resistant material than the material of the inner bolster surface.

15. The pet bed assembly of claim 10, wherein the bed is convertible between a stowed position and an operational position.

16. The pet bed assembly of claim 15, wherein when the bed is in the stowed position, the bottom portion of the case is folded in on the top portion of the case to conceal a majority of the top portion of the case and expose the bottom portion of the case, and the securing mechanism wraps around at least a portion of the bottom portion of the case to secure the bed in the stowed position.

17. The pet bed assembly of claim 10, wherein the top portion of the case and the bottom portion of the case are secured to each other via a zipper, wherein when the zipper is in an unzipped position, the interior volume is accessible such that the fluid-filled bladder may be removed from the interior volume.

18. A pet bed assembly comprising:
a case defining an interior volume, the case having a top portion and a bottom portion opposite the top portion, the case including a bed and a bolster;
a fluid-filled bladder disposed in the interior volume, the fluid-filled bladder including a bed bladder adjacent the bed of the case and a bolster bladder adjacent the bolster of the case, the bed bladder including a bed valve configured to receive a first fluid, and the bolster bladder including a bolster valve configured to receive a second fluid, the bed bladder including a plurality of ribs extending parallel to one another;
wherein the bed includes an inner bed surface and an outer bed surface opposite the inner bed surface, the inner bed surface defining an envelope including at least one fastener that selectively provides access to a cavity that is configured to receive a foam insert that has a shape generally corresponding to the shape of the bed.

19. The pet bed assembly of claim 18, wherein the inner bed surface includes a first fastener and a cover including a second fastener is configured to engage the first fastener to secure the cover to the case.

20. The pet bed assembly of claim 19, wherein the first fastener includes one of hooks or loops and the second fastener includes the other of hooks or loops.

* * * * *